United States Patent
A et al.

(10) Patent No.: US 12,284,218 B2
(45) Date of Patent: Apr. 22, 2025

(54) EFFICIENT UPDATING OF DEVICE-LEVEL SECURITY CONFIGURATION BASED ON CHANGES TO SECURITY INTENT POLICY MODEL

(71) Applicant: Juniper Networks, Inc., Sunnyvale, CA (US)

(72) Inventors: Chandrasekhar A, Bengaluru (IN); Jayanthi R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 324 days.

(21) Appl. No.: 18/070,948

(22) Filed: Nov. 29, 2022

(65) Prior Publication Data

US 2024/0179183 A1    May 30, 2024

(51) Int. Cl.
*H04L 9/40* (2022.01)
(52) U.S. Cl.
CPC .................... *H04L 63/20* (2013.01)
(58) Field of Classification Search
CPC ..... H04L 63/20; H04L 41/40; H04L 41/0894; H04L 41/0893; H04L 63/205
See application file for complete search history.

(56) References Cited

U.S. PATENT DOCUMENTS

| | | | |
|---|---|---|---|
| 9,239,717 B1 * | 1/2016 | AlSaeed | G06F 11/3664 |
| 9,323,760 B1 * | 4/2016 | Chopra | G06F 16/128 |
| 10,152,315 B1 * | 12/2018 | Olague | G06Q 20/10 |
| 10,200,248 B1 | 2/2019 | Jiang et al. | |
| 10,209,974 B1 * | 2/2019 | Patton | G06F 8/60 |
| 10,289,493 B1 * | 5/2019 | Miah | G06F 16/9024 |
| 10,771,506 B1 * | 9/2020 | Kumar | H04L 63/02 |
| 10,936,437 B1 * | 3/2021 | Santos | G06F 11/1469 |
| 10,997,247 B1 * | 5/2021 | Harris | G06F 16/128 |
| 11,132,602 B1 * | 9/2021 | Xie | G06F 9/44552 |
| 11,363,068 B2 | 6/2022 | Kuppannan et al. | |
| 11,483,317 B1 * | 10/2022 | Bolignano | G06F 21/577 |

(Continued)

FOREIGN PATENT DOCUMENTS

EP    3716532 A1    9/2020

OTHER PUBLICATIONS

Extended European Search Report for Application No. EP23153546, mailed on Aug. 14, 2023, 7 Pages.

*Primary Examiner* — Aravind K Moorthy
(74) *Attorney, Agent, or Firm* — Harrity & Harrity, LLP

(57) ABSTRACT

A system may identify a security intent policy model associated with an initial time. The system may generate one or more delta snapshots that respectively indicate one or more incremental changes to the security intent policy model at times subsequent to the initial time. The system may determine that the system is to deploy an updated version of the security intent policy model to a device and may thereby determine a previous deployment time at which the system deployed a previous version of the security intent policy model to the device. The system may generate, based on the one or more delta snapshots and the previous deployment time, a cumulative delta snapshot, and may thereby update a low-level security intent policy model associated with the device. The system may generate, based on the low-level security intent policy model, device-level security configuration information for the device.

20 Claims, 10 Drawing Sheets

(56) References Cited

U.S. PATENT DOCUMENTS

| | | | |
|---|---|---|---|
| 11,675,503 B1* | 6/2023 | Ekins | G06F 3/0637 |
| | | | 711/163 |
| 11,876,834 B1* | 1/2024 | Addis | H04L 63/20 |
| 12,013,824 B1* | 6/2024 | Reeves | G06F 11/302 |
| 12,032,585 B2* | 7/2024 | Xie | G06N 20/00 |
| 12,095,802 B1* | 9/2024 | Matear | H04L 63/1433 |
| 12,130,798 B1* | 10/2024 | Brahmadesam | G06F 3/065 |
| 12,147,315 B2* | 11/2024 | A | G06F 11/1448 |
| 2009/0019515 A1* | 1/2009 | Excoffier | H04L 67/34 |
| | | | 726/1 |
| 2009/0300416 A1* | 12/2009 | Watanabe | G06F 11/1484 |
| | | | 714/19 |
| 2009/0300646 A1* | 12/2009 | Wagner | G06F 9/541 |
| | | | 719/312 |
| 2012/0222123 A1* | 8/2012 | Williams | G06F 21/577 |
| | | | 726/25 |
| 2013/0081099 A1* | 3/2013 | Sathish | G06F 21/6245 |
| | | | 726/1 |
| 2013/0212709 A1* | 8/2013 | Tucker | G06F 21/55 |
| | | | 726/29 |
| 2014/0196115 A1* | 7/2014 | Pelykh | H04L 63/08 |
| | | | 726/4 |
| 2015/0052400 A1* | 2/2015 | Garrett | G06F 11/3664 |
| | | | 714/37 |
| 2015/0249682 A1* | 9/2015 | Zhang | H04L 63/20 |
| | | | 726/1 |
| 2016/0105313 A1* | 4/2016 | Jha | H04L 41/0816 |
| | | | 709/217 |
| 2016/0148246 A1* | 5/2016 | Thomas | G06N 20/00 |
| | | | 705/14.46 |
| 2016/0191466 A1* | 6/2016 | Pernicha | H04L 63/20 |
| | | | 726/1 |
| 2016/0330241 A1* | 11/2016 | Olivera | H04L 63/20 |
| 2017/0060449 A1* | 3/2017 | Zucca | G06F 3/0673 |
| 2017/0103212 A1* | 4/2017 | Deng | G06F 3/0619 |
| 2017/0242987 A1* | 8/2017 | Williams | G06F 21/128 |
| 2018/0075043 A1* | 3/2018 | Hasegawa | G06F 21/6218 |
| 2018/0176262 A1* | 6/2018 | Kavi | H04L 63/1408 |
| 2019/0156246 A1* | 5/2019 | Kuo | G06N 5/04 |
| 2019/0230112 A1* | 7/2019 | Gandham | H04L 63/1425 |
| 2019/0332486 A1* | 10/2019 | Aseev | G06F 16/907 |
| 2019/0354708 A1* | 11/2019 | Fisher | G06F 16/212 |
| 2020/0137231 A1* | 4/2020 | Revanur | H04M 3/5175 |
| 2020/0151619 A1* | 5/2020 | Mopur | H04L 67/12 |
| 2020/0244705 A1* | 7/2020 | Zaslavsky | G06Q 10/0639 |
| 2020/0285547 A1* | 9/2020 | Shukla | G06N 20/00 |
| 2020/0396256 A1* | 12/2020 | Jeong | H04L 47/32 |
| 2021/0075689 A1* | 3/2021 | Ramanathan | H04L 41/147 |
| 2021/0136117 A1* | 5/2021 | Kuppannan | H04L 63/20 |
| 2021/0144053 A1 | 5/2021 | A et al. | |
| 2021/0149770 A1* | 5/2021 | Doddaiah | G06N 3/044 |
| 2021/0241047 A1* | 8/2021 | Karanth | G06F 18/24137 |
| 2021/0255847 A1* | 8/2021 | Jean-Louis | G06F 8/63 |
| 2021/0326217 A1* | 10/2021 | Martin | G06F 3/067 |
| 2021/0326353 A1* | 10/2021 | Poetter | G06F 16/2282 |
| 2021/0345955 A1* | 11/2021 | Jones | A61B 5/6898 |
| 2021/0357196 A1* | 11/2021 | Shekar | G06F 8/60 |
| 2021/0367849 A1* | 11/2021 | Kandaswamy | H04L 45/02 |
| 2021/0392049 A1* | 12/2021 | Jeuk | H04L 41/16 |
| 2021/0406369 A1* | 12/2021 | Healy | G06F 21/562 |
| 2021/0409277 A1* | 12/2021 | Jeuk | H04L 41/12 |
| 2022/0011950 A1* | 1/2022 | Martin | G06F 21/78 |
| 2022/0067460 A1* | 3/2022 | Raj | G06N 20/00 |
| 2022/0086193 A1* | 3/2022 | Nguyen | H04L 63/205 |
| 2022/0100611 A1* | 3/2022 | Aseev | G06F 11/1451 |
| 2022/0101180 A1* | 3/2022 | Bhide | G06F 18/2113 |
| 2022/0103418 A1* | 3/2022 | Acharjee | G06N 20/00 |
| 2022/0129787 A1* | 4/2022 | Vogeti | G06N 20/00 |
| 2022/0137852 A1* | 5/2022 | Teixeira De Abreu Pinho | G06F 3/0653 |
| | | | 711/154 |
| 2022/0141256 A1* | 5/2022 | Jeong | G06F 16/27 |
| | | | 726/1 |
| 2022/0215111 A1* | 7/2022 | Ekins | G06F 21/6218 |
| 2022/0245507 A1* | 8/2022 | Yen | G06N 20/00 |
| 2022/0294699 A1* | 9/2022 | Yang | H04L 41/145 |
| 2022/0335106 A1* | 10/2022 | Marmanis | H04W 12/009 |
| 2022/0383122 A1* | 12/2022 | Pokorny | G06F 17/16 |
| 2022/0405619 A1* | 12/2022 | Ramamurthy | G06F 16/9024 |
| 2023/0030208 A1* | 2/2023 | Ebenezer | G06F 16/215 |
| 2023/0036517 A1* | 2/2023 | Ebenezer | G06F 16/2282 |
| 2023/0065379 A1* | 3/2023 | Prabhu Muraleedhara Prabhu | H04L 41/0816 |
| 2023/0066249 A1* | 3/2023 | Abelha Ferreira | G06N 5/02 |
| 2023/0087829 A1* | 3/2023 | Ponnuru | G06F 21/6218 |
| | | | 726/17 |
| 2023/0111775 A1* | 4/2023 | Lee | G06N 20/00 |
| | | | 706/12 |
| 2023/0115438 A1* | 4/2023 | DeGraaf | G06F 9/547 |
| | | | 707/652 |
| 2023/0123157 A1* | 4/2023 | Ramanan | H04L 63/1425 |
| | | | 706/12 |
| 2023/0177386 A1* | 6/2023 | Sargent | G06N 3/092 |
| | | | 706/12 |
| 2023/0205665 A1* | 6/2023 | Gritter | G06F 11/3075 |
| | | | 717/133 |
| 2023/0222001 A1* | 7/2023 | Verma | G06F 8/65 |
| | | | 718/102 |
| 2023/0376386 A1* | 11/2023 | Kochar | G06F 16/27 |
| 2023/0376801 A1* | 11/2023 | Rawashdeh | G06N 20/00 |
| 2023/0401288 A1* | 12/2023 | Dubin | G06F 18/214 |
| 2023/0421586 A1* | 12/2023 | Jadav | G06N 20/20 |
| 2023/0421615 A1* | 12/2023 | Visoky | G06F 8/65 |
| 2024/0095741 A1* | 3/2024 | Ameisen | G06Q 20/4016 |
| 2024/0134821 A1* | 4/2024 | Rogers | G06F 16/125 |
| 2024/0143303 A1* | 5/2024 | Kholodkov | G06F 8/65 |
| 2024/0176709 A1* | 5/2024 | A | H04L 41/0863 |

\* cited by examiner

EFFICIENT UPDATING OF DEVICE-LEVEL SECURITY CONFIGURATION BASED ON CHANGES TO SECURITY INTENT POLICY MODEL

BACKGROUND

Network devices typically include mechanisms, such as management interfaces, for locally or remotely configuring the network devices. By interacting with a management interface, an administrator can perform configuration tasks, such as configuring interface cards of a network device, adjusting parameters for supported network protocols of the network device, specifying physical components within the network device, modifying routing information maintained by the network device, accessing software modules and other resources residing on the network device, and/or other configuration tasks.

A network device can be configured by a network management system according to a declarative network operation model, such as an intent-based networking model. The network management system allows administrators to describe one or more intended states of the network device, such as an intended network state, execution state, storage state, and/or another state. Intents can be categorized as stateful intents or stateless intents. Stateful intents (also referred to as "business policies") may be resolved based on a current state of the network device. Stateless intents may be resolved regardless of the current state of the network state.

Intents may be represented in an intent data model, which may be modeled using a unified graph. For example, the intent data model may be represented as a connected graph having vertices (e.g., that represent configuration objects) connected with edges (e.g., that represent relationships between configuration objects). In order to configure a network device to perform the intents, translation programs translate high-level configuration information (e.g., that includes instructions according to the intent data model, which may be expressed as the connected graph) to low-level configuration information (e.g., that includes instructions according to a device configuration model) for the network device.

SUMMARY

Some implementations described herein relate to a method. The method may include identifying, by a system, a security intent policy model associated with an initial time. The method may include generating, by the system, one or more delta snapshots that respectively indicate one or more incremental changes to the security intent policy model at times subsequent to the initial time. The method may include determining, by the system, that the system is to deploy an updated version of the security intent policy model to a device. The method may include determining, by the system and based on determining that the system is to deploy the updated version of the security intent policy model, a previous deployment time at which the system deployed a previous version of the security intent policy model to the device. The method may include generating, by the system, and based on the one or more delta snapshots and the previous deployment time, a cumulative delta snapshot. The method may include updating, by the system and based on the cumulative delta snapshot, a low-level security intent policy model associated with the device. The method may include generating, by the system and based on the low-level security intent policy model, device-level security configuration information for the device.

Some implementations described herein relate to a non-transitory computer-readable medium that stores a set of instructions for a system. The set of instructions, when executed by one or more processors of the system, may cause the system to generate one or more delta snapshots that respectively indicate one or more incremental changes to a security intent policy model at times subsequent to an initial time. The set of instructions, when executed by one or more processors of the system, may cause the system to determine that the system is to deploy an updated version of the security intent policy model to a device. The set of instructions, when executed by one or more processors of the system, may cause the system to generate, based on determining that the system is to deploy the updated version of the security intent policy model to the device and based on the one or more delta snapshots, a cumulative delta snapshot. The set of instructions, when executed by one or more processors of the system, may cause the system to update, based on the cumulative delta snapshot, a low-level security intent policy model associated with the device. The set of instructions, when executed by one or more processors of the system, may cause the system to generate, based on the low-level security intent policy model, device-level security configuration information for the device.

Some implementations described herein relate to a system. The system may include one or more memories and one or more processors. The one or more processors may be configured to generate one or more delta snapshots that respectively indicate one or more incremental changes to a security intent policy model at times subsequent to an initial time. The one or more processors may be configured to determine that the system is to deploy an updated version of the security intent policy model to a device. The one or more processors may be configured to update, based on determining that the system is to deploy the updated version of the security intent policy model and based on at least some of the one or more delta snapshots, a low-level security intent policy model associated with the device. The one or more processors may be configured to generate, based on the low-level security intent policy model, device-level security configuration information for the device.

DETAILED DESCRIPTION

Figure 1A:
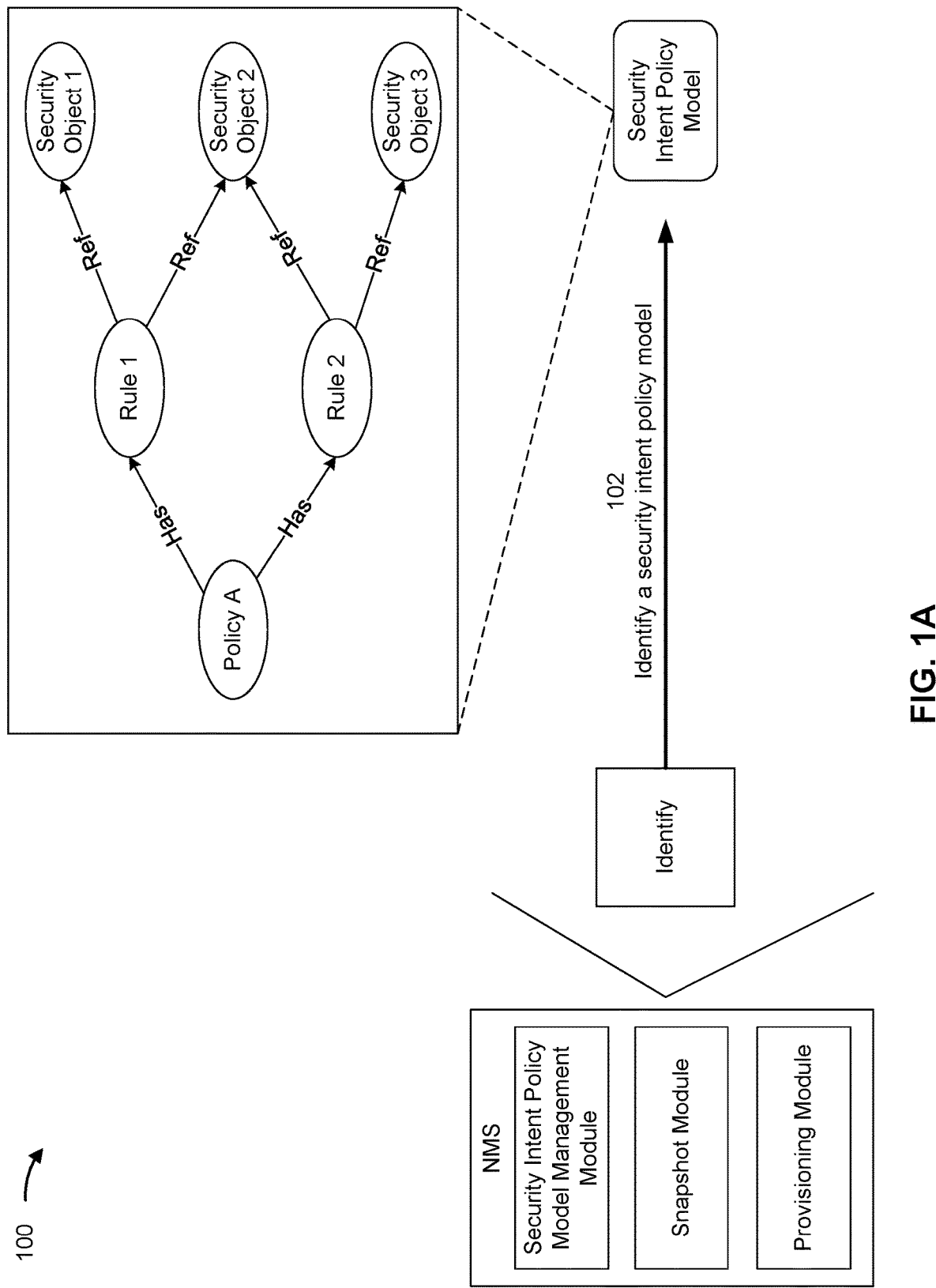
FIGS. 1A-1F are diagrams of one or more example implementations described herein.

The following detailed description of example implementations refers to the accompanying drawings. The same reference numbers in different drawings may identify the same or similar elements.

A network management system can generate, based on a security intent policy model (e.g., that describes a security policy that includes rules associated with security objects), device-level configuration information and provide the device-level configuration information to a network device to cause the device-level configuration information to be deployed on the network device. In many cases, however, changes are made to the security intent policy model after the device-level configuration information is deployed on the network device. The network device may therefore need to be updated with changes to the device-level configuration information that correspond to the changes to the security intent policy model.

Generating and deploying different device-level configuration information based on the updated security intent policy model utilizes computing resources (e.g., processing resources, memory resources, communication resources, and/or power resources, among other examples) of the network management system and the network device that could otherwise be utilized to perform other tasks. This impacts a performance of the network management system and the network device. In some cases, the network management system can use a "snapshot" approach to track changes to the security intent policy model at various times since a time of origination of the security intent policy model, such that the network management system can then generate and deploy a device-level configuration information patch that includes only changes to the security intent policy model since the time of origination. However, managing and storing all changes to the security intent policy model at different points in time requires further use of computing resources (e.g., processing resources, memory resources, communication resources, and/or power resources, among other examples). Further, in many cases, the security intent policy model is continually updated, so generating and deploying a device-level configuration information patch that includes changes since the time of origination often results in excessive use of computing resources, such as when the current version of the device-level configuration information deployed on the network device only needs to be updated based on a few recent changes to the security intent policy model.

Some implementations described herein provide a network management system (NMS). The NMS identifies a security intent policy model. The security intent policy model may be represented as a graph having a plurality of nodes connected by a plurality of edges. For example, the security intent policy model may include a policy node that is associated with a policy, one or more rule nodes that are associated with one or more rules of the policy, and one or more security object nodes that are associated with the one or more rules of the policy. Each node includes information that indicates, for example, a version indication associated with the node and/or a time of previous update of the node. Additionally, or alternatively, each security object node, of the one or more security object nodes, includes information that indicates a total number of rule nodes that are connected to the security object node and/or an identifier associated with each rule node that is connected to the security object node.

In some implementations, the NMS generates one or more delta snapshots that respectively indicate one or more incremental changes to the security intent policy model (e.g., associated with one or more delete operations, one or more create operations, and/or one or more update operations) at times subsequent to an initial time associated with the security intent policy model. That is, each of the one or more delta snapshots indicates changes to the security intent policy model at a particular time since a time associated with an immediately preceding delta snapshot.

In some implementations, the NMS determines that the NMS is to deploy an updated version of the security intent policy model to a device (e.g., based on receiving a message). The NMS therefore determines a previous version of the security intent policy model that the NMS deployed to the device and/or a previous deployment time at which the system deployed the previous version of the security intent policy model to the device. Accordingly, the NMS identifies a set of one or more delta snapshots, of the one or more delta snapshots, that were generated since deployment of the previous version of the security intent policy model and/or since the previous deployment time, and generates, based on the set of one or more delta snapshots, a cumulative delta snapshot.

In some implementations, the NMS maintains a low-level security intent policy model that is associated with the device. For example, the low-level security intent policy model includes the one or more security object nodes included in the security intent policy model (e.g., included in the previous version of the security intent policy model at the previous deployment time). The NMS then updates, based on the cumulative delta snapshot, the low-level security intent policy model. For example, the NMS may update the low-level security intent policy model to include the one or more security object nodes included in a current version of the security intent policy model. Accordingly, the NMS thereby generates and provides device-level security configuration information to the device (e.g., to cause the updated version of the security intent policy model to be deployed on the network device).

In this way, the NMS enables efficient use of computing resources (e.g., processing resources, memory resources, communication resources, and/or power resources, among other examples) of the NMS and the device. For example, by tracking incremental changes to a security intent policy model at particular times using delta snapshots, the NMS uses less computing resources than a network management system that tracks total changes to a security intent policy at particular times. Further, the NMS can more efficiently generate and provide device-level security configuration information to the device to cause an updated version of the security intent policy model to be deployed on the device. For example, fewer computing resources are used because only changes since a last deployment of device-level security configuration information are included in the device-level security configuration information, rather than all changes subsequent to an initial deployment. This also enables for quick deployment of the updated version of the intent policy model on the device (e.g., in real-time, or near real-time) after a decision to deploy the updated version of the intent policy model on the device is made.

FIGS. 1A-1F are diagrams of one or more example implementations 100 described herein. As shown in FIGS. 1A-1F, example implementation(s) 100 may include an NMS and a network device. The NMS and the network device are described in more detail below in connection with FIGS. 2-4. As shown in FIGS. 1A-1F, the NMS may include a security intent policy model management module, a snapshot module, and a provisioning module.

As shown in FIG. 1A, and by reference number 102, the NMS (e.g., using the security intent policy model management module) may identify a security intent policy model. The security intent policy model may be a graph-based policy model, where security intent policy objects are represented as nodes and relationships between security intent policy objects are represented as edges, or another type of intent-based model. For example, as shown in FIG. 1A, the security intent policy model may be represented as a graph having a plurality of nodes connected by a plurality of edges. The plurality of nodes may include a policy node that is associated with a policy (e.g., a security policy). The plurality of nodes may include one or more rule nodes (e.g., where each rule node is associated with a rule of the policy) that are connected to the policy node via one or more "has" edges of the plurality of edges (e.g., to indicate that the policy includes the one or more rules). The plurality of nodes may include one or more security object nodes (e.g., where each security object node is associated with a security object of the policy) that are connected to the one or more rule nodes via one or more "reference" edges of the plurality of edges (e.g., to indicate that the one or more rules apply to the one or more security object nodes). As a specific example, as shown in FIG. 1A, the security intent policy model may be represented as a graph that includes a policy node associated with a Policy A, a first rule node associated with a Rule 1 and a second rule node associated with a Rule 2, and a first security object node associated with a Security Object 1, a second security object node associated with a Security Object 2, and a third security object node associated with a Security Object 3. The policy node may be connected to the first rule node and the second rule node via respective has edges. The first rule node may be connected to the first security object node and the second object node via respective reference edges, and the second rule node may be connected to the second security object node and the third object node via respective reference edges.

In some implementations, each node of the security intent policy model may include information. The information may indicate, for example, a name of the node, an identifier associated with the node (e.g., a universally unique identifier (UUID) or another identifier associated with the node), a type of the node (e.g., that indicates whether the node is a policy node, a rule node, a security object node, or another type of node), a version indication associated with the node, and/or a time of previous update of the node. Additionally, or alternatively, each security object node may include, for example, information that indicates a total number of rule nodes, of the one or more rule nodes, that are connected to the security object node and/or an identifier associated with each rule node that is connected to the security object node. For example, the first security object node (e.g., associated with the Security Object 1) may include information indicating that the first security object node is associated with one rule node, the first rule node (e.g., that is associated with the Rule 1); the second security object node (e.g., associated with the Security Object 2) may include information indicating that the second security object node is associated with two rule nodes, the first rule node (e.g., that is associated with the Rule 1) and the second rule node (e.g., that is associated with the Rule 1); and the third security object node (e.g., associated with the Security Object 3) may include information indicating that the third security object node is associated with one rule node, the second rule node (e.g., that is associated with the Rule 2).

Figure 1B:
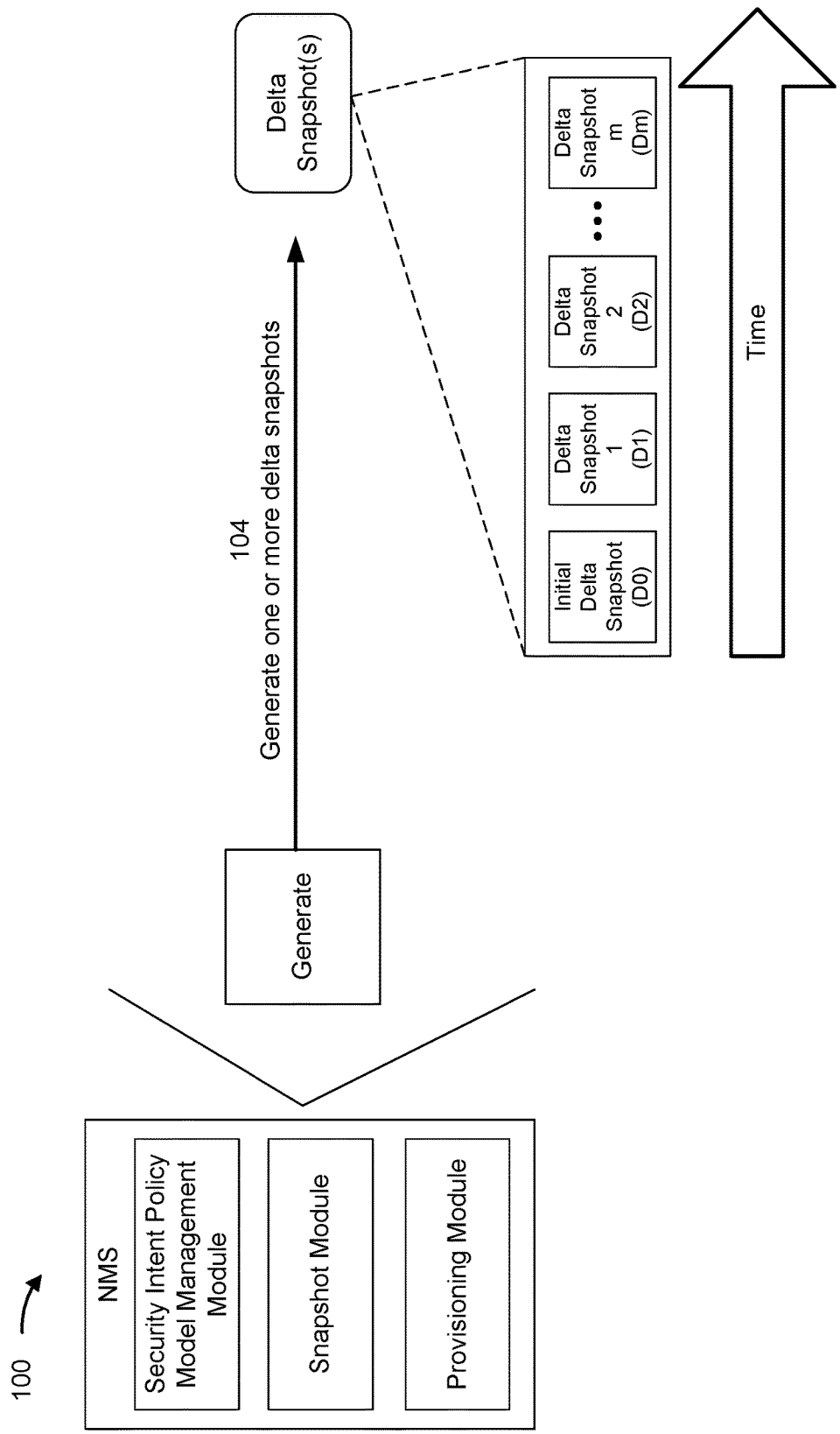

As shown in FIG. 1B, and by reference number 104, the NMS (e.g., using the snapshot module) may generate one or more delta snapshots. For example, the NMS may identify an initial time that is associated with the security intent policy model, such as a time when the NMS identified the security intent policy model (e.g., as described herein in relation to FIG. 1A and reference number 102). The initial time may indicate a time when the security intent policy model has not yet changed (e.g., when the security intent policy model is a "base" security intent policy model). The NMS then may generate one or more delta snapshots that respectively indicate one or more incremental changes to the security intent policy model at times subsequent to the initial time. For example, as shown in FIG. 1B, the NMS may generate an initial delta snapshot (DO) that indicates one or more first changes to the intent policy model subsequent to the initial time to a first time T1; may generate a first delta snapshot (D1) that indicates one or more changes to the intent policy model from the first time T1 to a second time T2; may generate a second delta snapshot (D2) that indicates one or more changes to the intent policy model from the second time T2 to a third time T3; and so on.

Figure 1C:
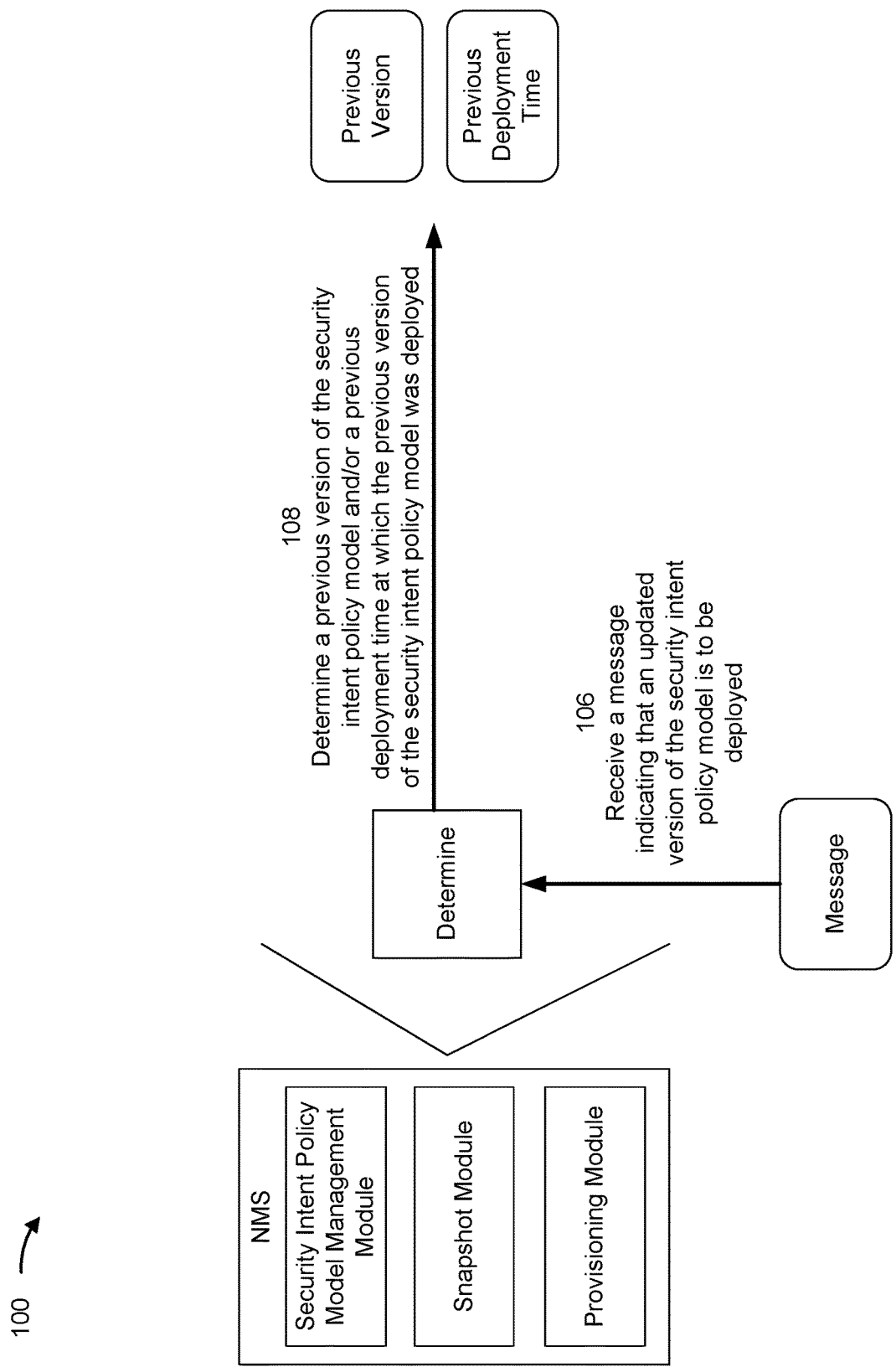

As shown in FIG. 1C, and by reference number 106, the NMS (e.g., using the security intent policy model management module) may receive a message. The message may indicate that the NMS is to deploy an updated version of the security intent policy model to a device, such as the network device. For example, the NMS may receive the message from the network device, or another device (e.g., a user device associated with an administrator of the network device). Accordingly, the NMS may determine that the NMS is to deploy an updated version of the security intent policy model to the device.

As shown by reference number 108, the NMS (e.g., using the snapshot module) may determine (e.g., based on the message and/or determining that the NMS is to deploy an updated version of the security intent policy model to the device) a previous version of the security intent policy model that the NMS deployed to the device, and/or a previous deployment time at which the NMS deployed the previous version of the security intent policy model to the device. For example, the NMS may process (e.g., read and/or parse) the message to identify the device. The NMS may search, based on the identified device, a data structure (e.g., a database, a table, a file, or another type of data structure), for an entry that indicates the previous version of the intent policy model and/or the previous deployment time. The NMS may process (e.g., read and/or parse) the entry to determine the previous version of the intent policy model and/or the previous deployment time.

Figure 1D:
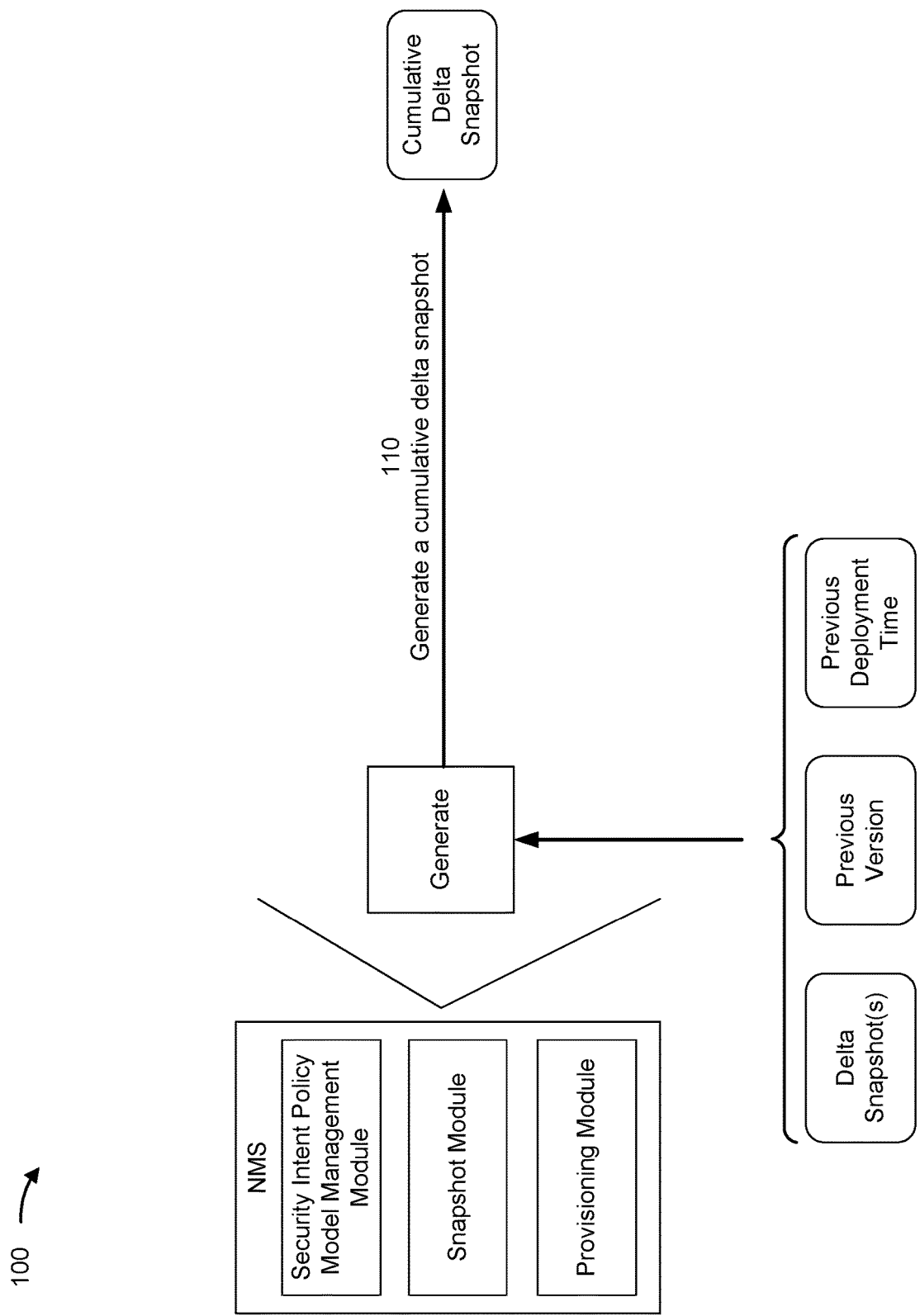

As shown in FIG. 1D, and by reference number 110, the NMS (e.g., using the snapshot module) may generate a cumulative delta snapshot (e.g., based on the one or more delta snapshots, the previous version of the security intent policy model, and/or the previous deployment time). In some implementations, the NMS may identify a set of one or more delta snapshots, of the one or more delta snapshots, that were generated since the previous version of the security intent policy model was deployed, such as since the previous deployment time, and may generate, based on the set of one or more delta snapshots, the cumulative delta snapshot. In this way, the cumulative delta snapshot may indicate one or more changes to the security intent policy model since the previous version of the security intent policy model and/or the previous deployment time (e.g., one or more changes associated with a time that is later than the previous deployment time).

In some implementations, the NMS (e.g., using the security intent policy model management module) may maintain a low-level security intent policy model that is associated with the device. The low-level security intent policy model may include one or more security object nodes. For example, the low-level security intent policy model may include the one or more security object nodes included in the security intent policy model. That is, the low-level security intent policy model may include the one or more security object nodes included in the previous version of the security intent policy model (e.g., at the previous deployment time). Accordingly, each security object node of the low-level security intent policy model may include information that indicates, for example, a name of the security object node, an identifier associated with the security object node, a version indication associated with the security object node, a time of previous update of the security object node, a total number of rules that are associated with the security object node, and/or an identifier associated with each rule that is associated with the security object node.

Figure 1E:
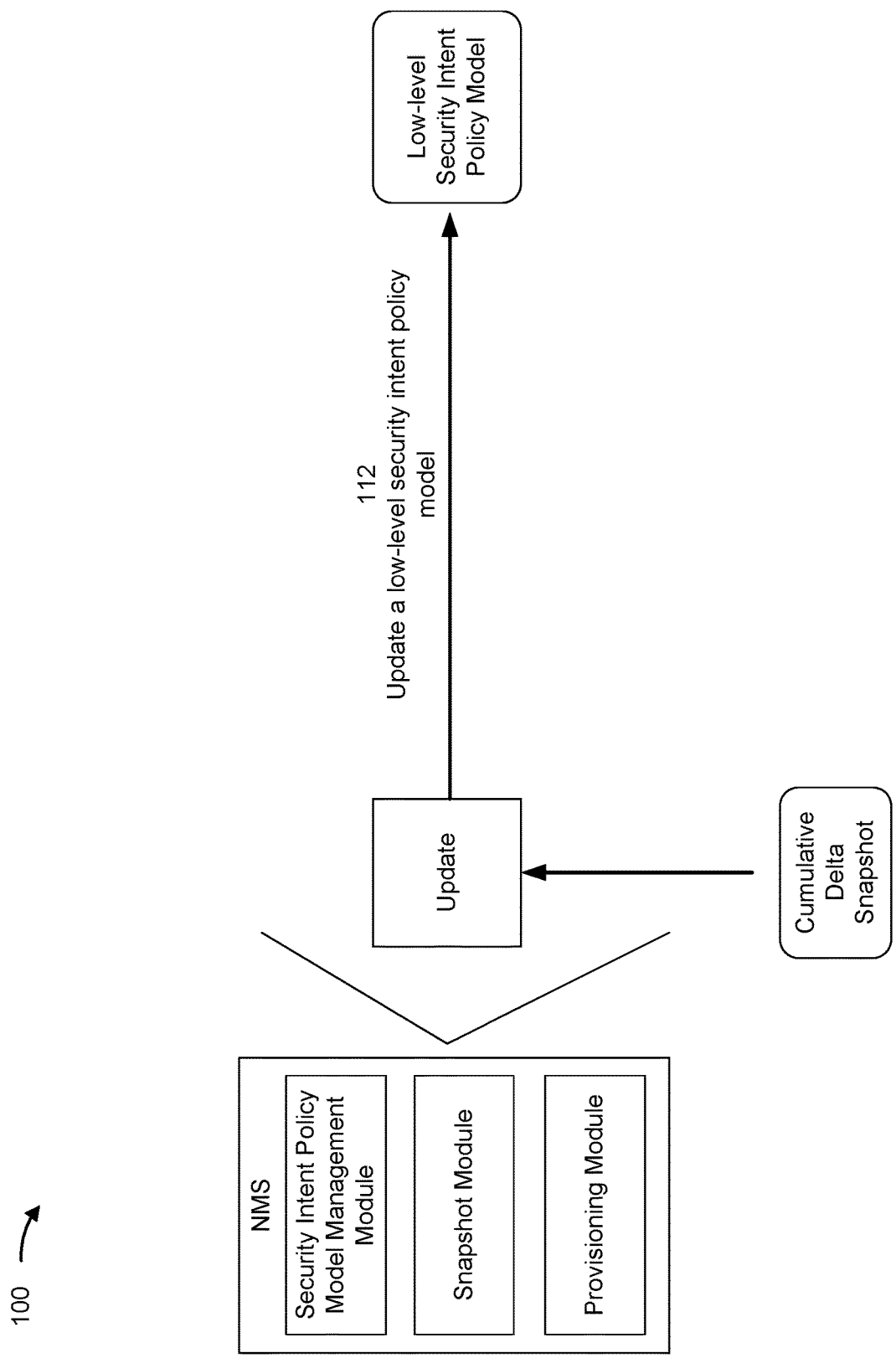

As shown in FIG. 1E, and by reference number 112, the NMS (e.g., using the snapshot module and/or the security intent policy model management module) may update the low-level security intent policy model that is associated with the device (e.g., based on the cumulative deployment snapshot). In some implementations, the NMS may update the low-level security intent policy model to include the one or more security object nodes included in a current version of the security intent policy model.

For example, to update the low-level security intent policy model, the NMS may identify a delete operation in the cumulative delta snapshot that indicates a security object and a rule (e.g., a rule associated with a security object that was deleted from the security intent policy model). The NMS may therefore update information included in a security object node in the low-level security intent policy model that is associated with the security object, such as by removing an identifier associated with the rule, decrementing a total number of rules that are associated with the security object node by one, and/or updating a time of previous update of the security object node (e.g., to the current time). As another example, the NMS may identify a create operation in the cumulative delta snapshot that indicates a security object and a rule (e.g., a rule associated with a security object that was created in the security intent policy model). The NMS may therefore generate a security object node in the low-level security intent policy model that is associated with the security object, and update information included in the security object, such as by including an identifier associated with the rule, setting a total number of rules that are associated with the security object to one, and/or updating a time of previous update of the security object node (e.g., to the current time). In an additional example, the NMS may identify an update operation in the cumulative delta snapshot that indicates a security object and a rule (e.g., a rule associated with a security object that was updated in the security intent policy model). The NMS may therefore update information included in a security object node in the low-level security intent policy model that is associated with the security object, such as by updating an identifier associated with the rule and/or updating a time of previous update of the security object node (e.g., to the current time).

Figure 1F:
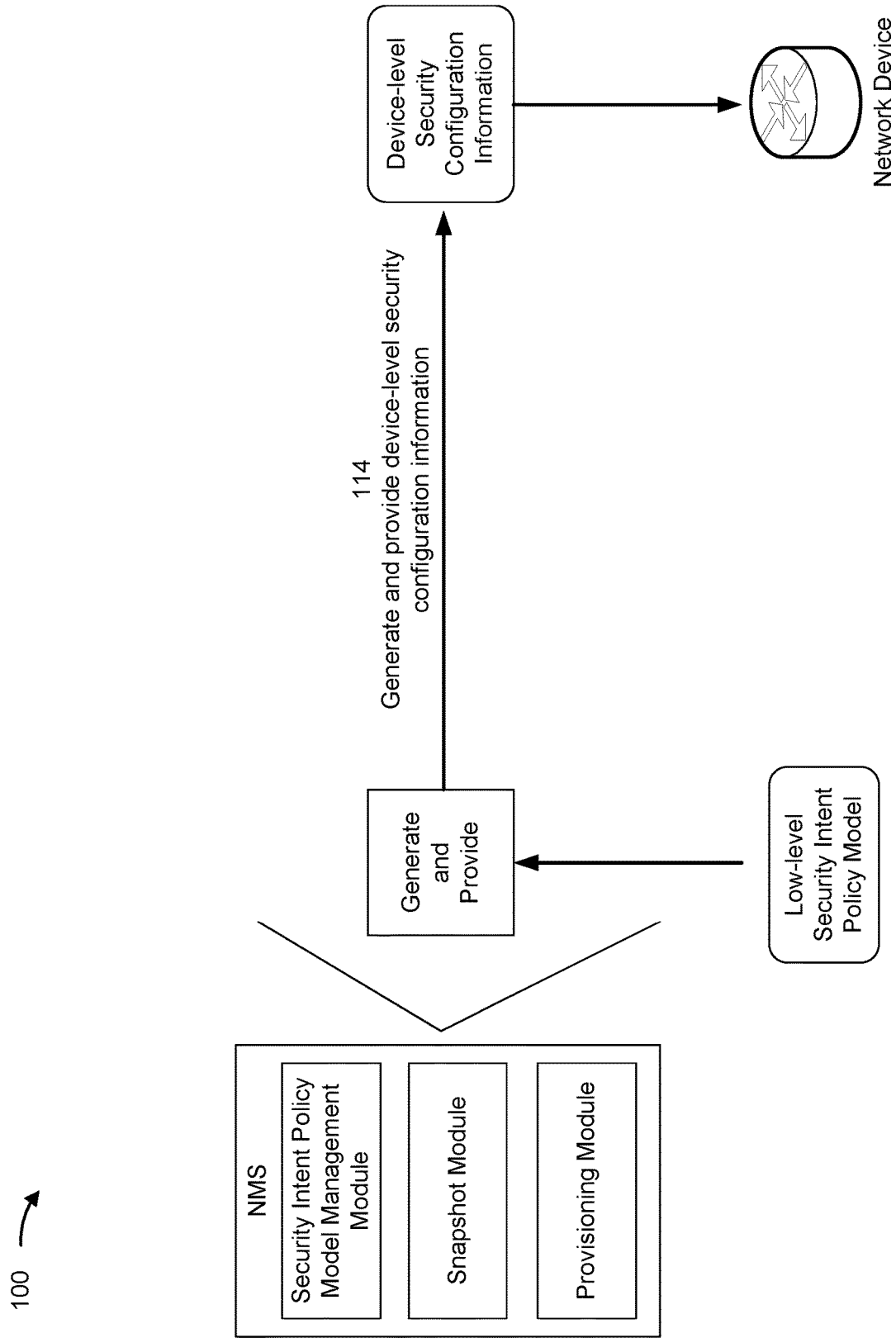

As shown in FIG. 1F, and by reference number 114, the NMS (e.g., using the provisioning module) may generate and provide device-level security configuration information for the device (e.g., based on the low-level security intent policy model, such as after being updated as described herein in relation to FIG. 1E and reference number 112). For example, the NMS may identify one or more security object nodes in the low-level security intent policy model that have been updated since the previous deployment time, and may generate, based on the one or more security object nodes, the device-level security configuration information for the network device (e.g., based on information related to the resources and capabilities of the network device that is accessible to the NMS). The NMS may send the device-level security configuration information to the network device. The network device then may process the device-level security configuration information to include the one or more changes to the security intent policy model from the previous deployment time. In this way, providing the device-level security configuration information permits the updated version of the security intent policy model to be deployed on the network device.

In some implementations, such as after updating the low-level security intent policy model and/or generating and providing the device-level security configuration information, information included in a security object node in the low-level security intent policy model may indicate that a number of rules that are associated with the security object node is zero (e.g., based on one or more delete operations included in the cumulative deployment snapshot). Accordingly, the NMS (e.g., using the snapshot module and/or the security intent policy model management module) may remove the security object node from the low-level security intent policy model. In this way, the NMS may cause the low-level security intent policy model to not include one or more security object nodes that are not included in the current version of the security intent policy model, and therefore to include only the one or more security object nodes included in the current version of the security intent policy model.

As indicated above, FIGS. 1A-1F are provided merely as one or more examples. Other examples may differ from what is described with regard to FIGS. 1A-1F.

Figure 2:
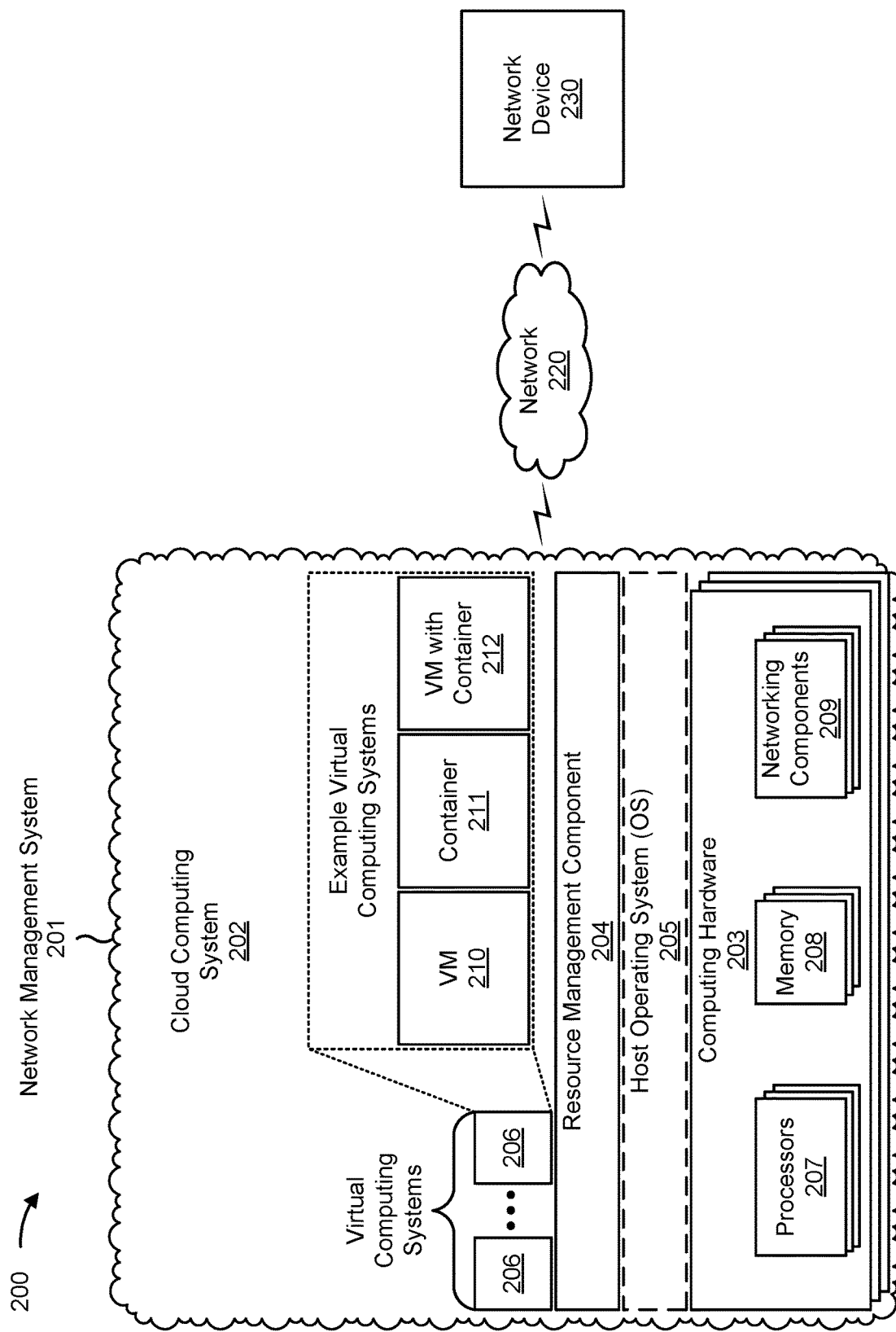
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 201, which may include one or more elements of and/or may execute within a cloud computing system 202. The cloud computing system 202 may include one or more elements 203-212, as described in more detail below. As further shown in FIG. 2, environment 200 may include a network 220 and/or a network device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-212 of the cloud computing system 202, may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as device 300 of FIG. 3 or device 400 of FIG. 4, which may include a standalone server or another type of computing device. The network management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network device 230 includes one or more devices capable of receiving, processing, storing, routing, and/or providing traffic (e.g., a packet or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computer devices of a cloud computing environment or a data center. In some implementations, a group of network devices 230 may be a group of data center nodes that are used to route traffic flow through network 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
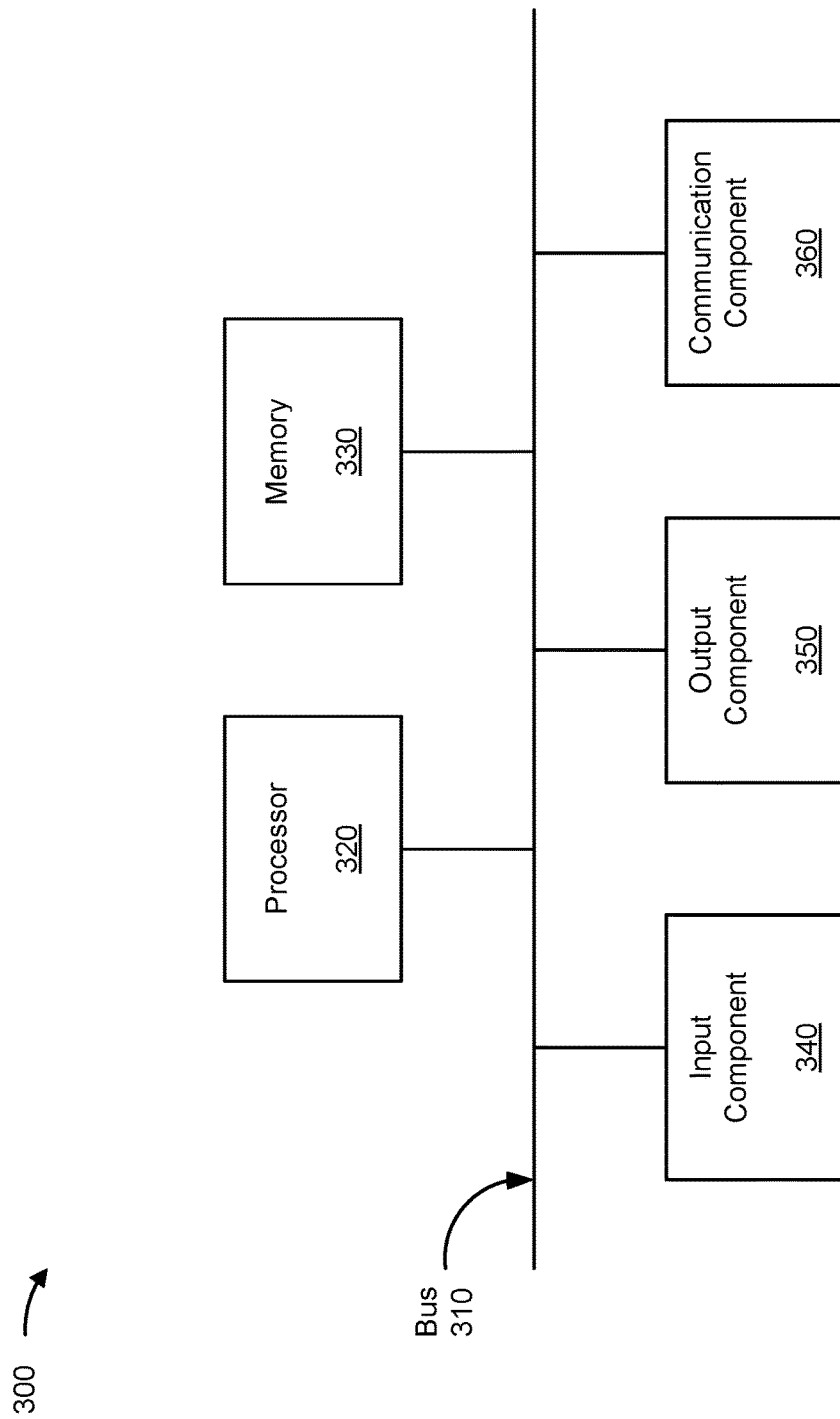
FIG. 3 is a diagram of example components of a device associated with efficient updating of a device-level security configuration based on changes to a security intent policy model.

FIG. 3 is a diagram of example components of a device 300 associated with efficient updating of a device-level security configuration based on changes to a security intent policy model. The device 300 may correspond to the network management system 201, the computing hardware 203, and/or the network device 230. In some implementations the network management system 201, the computing hardware 203, and/or the network device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
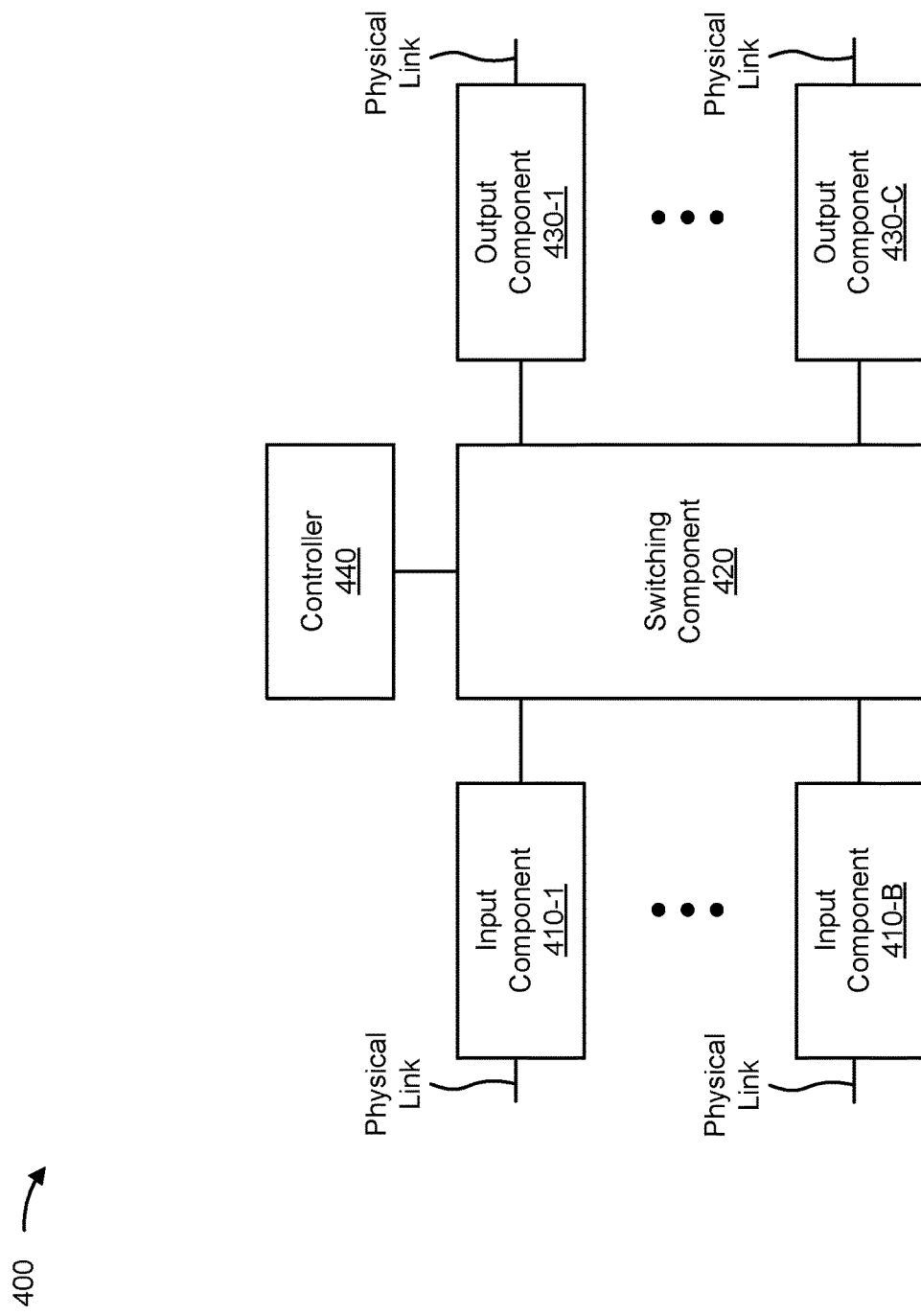
FIG. 4 is a diagram of example components of a device associated with efficient updating of a device-level security configuration based on changes to a security intent policy model.

FIG. 4 is a diagram of example components of a device 400 associated with efficient updating of a device-level security configuration based on changes to a security intent policy model. Device 400 may correspond to the network management system 201, the computing hardware 203, and/or the network device 230. In some implementations, the network management system 201, the computing hardware 203, and/or the network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
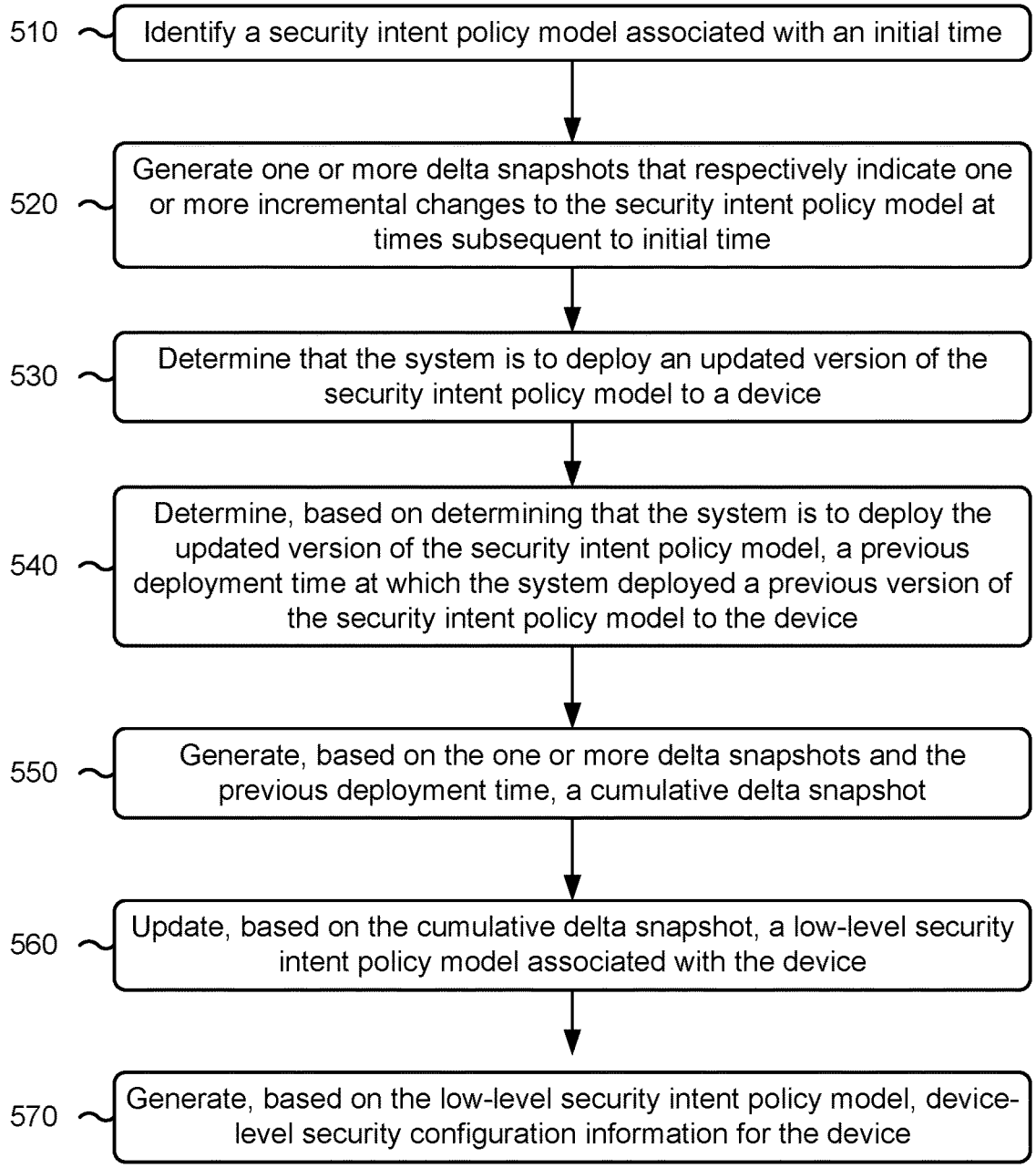
FIG. 5 is a flowchart of an example process associated with efficient updating of a device-level security configuration based on changes to a security intent policy model.

FIG. 5 is a flowchart of an example process 500 associated with efficient updating of a device-level security configuration based on changes to a security intent policy model. In some implementations, one or more process blocks of FIG. 5 are performed by a system (e.g., the network management system 201). In some implementations, one or more process blocks of FIG. 5 are performed by another device or a group of devices separate from or including the system, such as a network device (e.g., the network device 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include identifying a security intent policy model associated with an initial time (block 510). For example, the system may identify a security intent policy model associated with an initial time, as described above.

As further shown in FIG. 5, process 500 may include generating one or more delta snapshots that respectively indicate one or more incremental changes to the security intent policy model at times subsequent to the initial time (block 520). For example, the system may generate one or more delta snapshots that respectively indicate one or more incremental changes to the security intent policy model at times subsequent to the initial time, as described above.

As further shown in FIG. 5, process 500 may include determining that the system is to deploy an updated version of the security intent policy model to a device (block 530). For example, the system may determine that the system is to deploy an updated version of the security intent policy model to a device, as described above.

As further shown in FIG. 5, process 500 may include determining, based on determining that the system is to deploy the updated version of the security intent policy model, a previous deployment time at which the system deployed a previous version of the security intent policy model to the device (block 540). For example, the system may determine, based on determining that the system is to deploy the updated version of the security intent policy model, a previous deployment time at which the system deployed a previous version of the security intent policy model to the device, as described above.

As further shown in FIG. 5, process 500 may include generating based on the one or more delta snapshots and the previous deployment time, a cumulative delta snapshot (block 550). For example, the system may generate and based on the one or more delta snapshots and the previous deployment time, a cumulative delta snapshot, as described above.

As further shown in FIG. 5, process 500 may include updating, based on the cumulative delta snapshot, a low-level security intent policy model associated with the device (block 560). For example, the system may update, based on the cumulative delta snapshot, a low-level security intent policy model associated with the device, as described above.

As further shown in FIG. 5, process 500 may include generating, based on the low-level security intent policy model, device-level security configuration information for the device (block 570). For example, the system may generate, based on the low-level security intent policy model, device-level security configuration information for the device, as described above.

Process 500 may include additional implementations, such as any single implementation or any combination of implementations described below and/or in connection with one or more other processes described elsewhere herein.

In a first implementation, the security intent policy model is represented as a graph having a plurality of nodes connected by a plurality of edges, wherein the plurality of nodes includes a policy node that is associated with a policy, and the plurality of nodes includes one or more rule nodes that are connected to the policy node via one or more has edges of the plurality of edges, wherein each rule node is associated with a rule of the policy, and the plurality of nodes includes one or more security object nodes that are connected to the one or more rule nodes via one or more reference edges of the plurality of edges, wherein each security object node is associated with a security object of the policy.

In a second implementation, alone or in combination with the first implementation, each node, of the plurality of nodes of the security intent policy model, includes information that indicates at least one of: a name of the node, an identifier associated with the node, a type of the node, a version indication associated with the node, or a time of previous update of the node.

In a third implementation, alone or in combination with one or more of the first and second implementations, each security object node, of the one or more security object nodes, includes information that indicates at least one of: a total number of rule nodes, of the one or more rule nodes, that are connected to the security object node, or an identifier associated with each rule node that is connected to the security object node.

In a fourth implementation, alone or in combination with one or more of the first through third implementations, the low-level security intent policy model includes one or more security object nodes, wherein each security object node includes information that indicates at least one of: a name of the security object node, a type of the security object node, an identifier associated with the security object node, a version indication associated with the security object node, a time of previous update of the security object node, a total number of rules that are associated with the security object node, or an identifier associated with each rule that is associated with the security object node.

In a fifth implementation, alone or in combination with one or more of the first through fourth implementations, updating the low-level security intent policy model comprises identifying a delete operation in the cumulative delta snapshot that indicates a security object and a rule, and updating information included in a security object node in the low-level security intent policy model that is associated with the security object by removing an identifier associated with the rule, decrementing a total number of rules that are associated with the security object node by one, and updating a time of previous update of the security object node.

In a sixth implementation, alone or in combination with one or more of the first through fifth implementations, updating the low-level security intent policy model comprises identifying a create operation in the cumulative delta snapshot that indicates a security object and a rule, generating a security object node in the low-level security intent policy model that is associated with the security object, and updating information included in the security object node by including an identifier associated with the rule, setting a total number of rules that are associated with the security object node to one, and updating a time of previous update of the security object node.

In a seventh implementation, alone or in combination with one or more of the first through sixth implementations, updating the low-level security intent policy model comprises identifying an update operation in the cumulative delta snapshot that indicates a security object and a rule, and updating information included in a security object node in the low-level security intent policy model that is associated with the security object by updating an identifier associated with the rule, and updating a time of previous update of the security object node.

In an eighth implementation, alone or in combination with one or more of the first through seventh implementations, generating the device-level security configuration information for the device comprises identifying one or more security object nodes in the low-level security intent policy model that have been updated since the previous deployment time, and generating, based on the one or more security object nodes, the device-level provisioning configuration information.

In a ninth implementation, alone or in combination with one or more of the first through eighth implementations, process 500 includes providing the device-level security configuration information to the device, wherein providing the device-level security configuration information permits the updated version of the security intent policy model to be deployed on the device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a system, a security intent policy model associated with an initial time;
   generating, by the system, one or more delta snapshots that respectively indicate one or more incremental changes to the security intent policy model at times subsequent to the initial time;
   determining, by the system, that the system is to deploy an updated version of the security intent policy model to a device;
   determining, by the system and based on determining that the system is to deploy the updated version of the security intent policy model, a previous deployment time at which the system deployed a previous version of the security intent policy model to the device;
   generating, by the system, and based on the one or more delta snapshots and the previous deployment time, a cumulative delta snapshot;

updating, by the system and based on the cumulative delta snapshot, a low-level security intent policy model associated with the device; and generating, by the system and based on the low-level security intent policy model, device-level security configuration information for the device.

2. The method of claim 1, wherein the security intent policy model is represented as a graph having a plurality of nodes connected by a plurality of edges, wherein:
the plurality of nodes includes a policy node that is associated with a policy; and
the plurality of nodes includes one or more rule nodes that are connected to the policy node via one or more has edges of the plurality of edges,
wherein each rule node is associated with a rule of the policy, and
the plurality of nodes includes one or more security object nodes that are connected to the one or more rule nodes via one or more reference edges of the plurality of edges,
wherein each security object node is associated with a security object of the policy.

3. The method of claim 2, wherein each node, of the plurality of nodes of the security intent policy model, includes information that indicates at least one of:
a name of the node,
an identifier associated with the node,
a type of the node,
a version indication associated with the node, or
a time of previous update of the node.

4. The method of claim 2, wherein each security object node, of the one or more security object nodes, includes information that indicates at least one of:
a total number of rule nodes, of the one or more rule nodes, that are connected to the security object node, or
an identifier associated with each rule node that is connected to the security object node.

5. The method of claim 1, wherein the low-level security intent policy model includes one or more security object nodes,
wherein each security object node includes information that indicates at least one of:
a name of the security object node,
a type of the security object node,
an identifier associated with the security object node,
a version indication associated with the security object node,
a time of previous update of the security object node,
a total number of rules that are associated with the security object node, or
an identifier associated with each rule that is associated with the security object node.

6. The method of claim 1, wherein updating the low-level security intent policy model comprises:
identifying a delete operation in the cumulative delta snapshot that indicates a security object and a rule; and
updating information included in a security object node in the low-level security intent policy model that is associated with the security object by:
removing an identifier associated with the rule,
decrementing a total number of rules that are associated with the security object node by one, and
updating a time of previous update of the security object node.

7. The method of claim 1, wherein updating the low-level security intent policy model comprises:

identifying a create operation in the cumulative delta snapshot that indicates a security object and a rule;
generating a security object node in the low-level security intent policy model that is associated with the security object; and
updating information included in the security object node by:
including an identifier associated with the rule,
setting a total number of rules that are associated with the security object node to one, and
updating a time of previous update of the security object node.

8. The method of claim 1, wherein updating the low-level security intent policy model comprises:
identifying an update operation in the cumulative delta snapshot that indicates a security object and a rule; and
updating information included in a security object node in the low-level security intent policy model that is associated with the security object by:
updating an identifier associated with the rule, and
updating a time of previous update of the security object node.

9. The method of claim 1, wherein generating the device-level security configuration information for the device comprises:
identifying one or more security object nodes in the low-level security intent policy model that have been updated since the previous deployment time; and
generating, based on the one or more security object nodes, the device-level provisioning configuration information.

10. The method of claim 1, further comprising:
providing the device-level security configuration information to the device,
wherein providing the device-level security configuration information permits the updated version of the security intent policy model to be deployed on the device.

11. A non-transitory computer-readable medium storing a set of instructions, the set of instructions comprising:
one or more instructions that, when executed by one or more processors of a system, cause the system to:
generate one or more delta snapshots that respectively indicate one or more incremental changes to a security intent policy model at times subsequent to an initial time;
determine that the system is to deploy an updated version of the security intent policy model to a device;
generate, based on determining that the system is to deploy the updated version of the security intent policy model to the device and based on the one or more delta snapshots, a cumulative delta snapshot;
update, based on the cumulative delta snapshot, a low-level security intent policy model associated with the device; and
generate, based on the low-level security intent policy model, device-level security configuration information for the device.

12. The non-transitory computer-readable medium of claim 11, wherein the one or more instructions, that cause the system to generate the cumulative delta snapshot, cause the system to:
determine, based on determining that the system is to deploy the updated version of the security intent policy model, a previous deployment time at which the system deployed a previous version of the security intent policy model to the device;

identify a set of one or more delta snapshots, of the one or more delta snapshots, that were generated since the previous deployment time; and generate, based on the set of one or more delta snapshots, the cumulative delta snapshot.

13. The non-transitory computer-readable medium of claim 11, wherein the one or more instructions, that cause the system to update the low-level security intent policy model, cause the system to:

identify a delete operation in the cumulative delta snapshot that indicates a security object and a rule; and update information included in a security object node in the low-level security intent policy model that is associated with the security object by:
removing an identifier associated with the rule,
decrementing a total number of rules that are associated with the security object node by one, and
updating a time of previous update of the security object node.

14. The non-transitory computer-readable medium of claim 11, wherein the one or more instructions, that cause the system to update the low-level security intent policy model, cause the system to:

identify a create operation in the cumulative delta snapshot that indicates a security object and a rule;

generate a security object node in the low-level security intent policy model that is associated with the security object; and update information included in the security object by:
including an identifier associated with the rule,
setting a total number of rules that are associated with the security object node to one, and
updating a time of previous update of the security object node.

15. The non-transitory computer-readable medium of claim 11, wherein the one or more instructions, that cause the system to update the low-level security intent policy model, cause the system to:

identify an update operation in the cumulative delta snapshot that indicates a security object and a rule; and update information included in a security object node in the low-level security intent policy model that is associated with the security object by:
updating an identifier associated with the rule, and
updating a time of previous update of the security object node.

16. The non-transitory computer-readable medium of claim 11, wherein the one or more instructions, that cause the system to generate the device-level security configuration information for the device, cause the system to:

generate, based on one or more security object nodes in the low-level security intent policy model that have been updated since a previous deployment time of a previous version of the security intent policy model to the device, the device-level security configuration information.

17. The non-transitory computer-readable medium of claim 11, wherein the one or more instructions further cause the system to:

provide the device-level security configuration information to the device,
wherein providing the device-level security configuration information permits the updated version of the security intent policy model to be deployed on the device.

18. A system, comprising:

one or more memories; and one or more processors to:

generate one or more delta snapshots that respectively indicate one or more incremental changes to a security intent policy model at times subsequent to an initial time;

determine that the system is to deploy an updated version of the security intent policy model to a device;

update, based on determining that the system is to deploy the updated version of the security intent policy model and based on at least some of the one or more delta snapshots, a low-level security intent policy model associated with the device; and generate, based on the low-level security intent policy model, device-level security configuration information for the device.

19. The system of claim 18, wherein the one or more processors, to update the low-level security intent policy model, are to:

determine, based on determining that the system is to deploy the updated version of the security intent policy model, a previous deployment time at which the system deployed a previous version of the security intent policy model to the device;

generate, and based on the one or more delta snapshots and the previous deployment time, a cumulative delta snapshot; and update, based on the cumulative delta snapshot, the low-level security intent policy model associated with the device.

20. The system of claim 18, wherein the one or more processors are further to:

provide the device-level security configuration information to the device,
wherein providing the device-level security configuration information permits the updated version of the security intent policy model to be deployed on the device.

* * * * *